United States Patent [19]

Heller et al.

[11] Patent Number: 5,355,222
[45] Date of Patent: Oct. 11, 1994

[54] OPTICAL RECEIVER FOR AREA LOCATION SYSTEM

[75] Inventors: Alan C. Heller; Christopher W. Fox; Philip D. Olivier, all of San Antonio, Tex.

[73] Assignee: Precision Tracking FM, Inc., San Antonio, Tex.

[21] Appl. No.: 884,076

[22] Filed: May 15, 1992

[51] Int. Cl.$^5$ .................. G01B 11/00; G01B 9/00; G01C 3/32
[52] U.S. Cl. ..................... 356/375; 250/561
[58] Field of Search ............... 356/373, 375, 141, 152; 250/561

[56] References Cited

U.S. PATENT DOCUMENTS

| | | | |
|---|---|---|---|
| 2,855,539 | 10/1958 | Hoover | 356/152 |
| 3,602,903 | 8/1971 | Requa et al. | 356/152 |
| 3,614,240 | 10/1971 | Brandts et al. | 356/152 |
| 4,099,879 | 7/1978 | Britz et al. | 356/141 |
| 4,193,689 | 3/1980 | Reymond et al. | 356/152 |
| 4,315,690 | 2/1982 | Trocellier et al. | 356/152 |
| 4,410,804 | 10/1983 | Stauffer | 250/578 |
| 4,576,481 | 3/1986 | Hansen | 356/375 |
| 4,625,108 | 11/1986 | Nestel et al. | 250/227 |
| 4,674,874 | 6/1987 | Halldorsson et al. | 356/152 |
| 4,703,167 | 10/1987 | Okumura et al. | 356/141 |
| 4,710,028 | 12/1987 | Grenier et al. | 356/375 |
| 4,797,557 | 1/1989 | Ohman | 250/561 |
| 4,806,747 | 2/1989 | Dunavan et al. | 250/203 R |
| 4,815,840 | 3/1989 | Benayad-Cherif et al. | 356/1 |
| 4,825,063 | 4/1989 | Halldorsson et al. | 250/203 R |
| 4,857,721 | 8/1989 | Dunavan et al. | 356/141 |
| 4,866,362 | 9/1989 | Parker et al. | 318/368.1 |

*Primary Examiner*—James C. Housel
*Assistant Examiner*—Rachel Freed
*Attorney, Agent, or Firm*—Baker & Botts

[57] ABSTRACT

An optical location system for locating the position of a moving object in a defined area. An optical transmitter is attached to the moving object. A stationary receiver has a number of sensors for receiving a signal from the transmitter. One sensor has a field of view of the entire area. Other sensors have partially blocked fields of view, with the blocking being accomplished with nonopaque strips of decreasing width. These strips are arranged so that the detection or nondetection of light by the sensors can be digitally coded in a manner that corresponds to sections of the area.

19 Claims, 7 Drawing Sheets

|   | A | B | C | D | E | F | G | H |   |
|---|---|---|---|---|---|---|---|---|---|
| 8 | 1 111 111 | 1 110 111 | 1 101 111 | 1 100 111 | 1 011 111 | 1 010 111 | 1 001 111 | 1 000 111 | 8 |
| 7 | 1 111 110 | 1 110 110 | 1 101 110 | 1 100 110 | 1 011 110 | 1 010 110 | 1 001 110 | 1 000 110 | 7 |
| 6 | 1 111 101 | 1 110 101 | 1 101 101 | 1 100 101 | 1 011 101 | 1 010 101 | 1 001 101 | 1 000 101 | 6 |
| 5 | 1 111 100 | 1 110 100 | 1 101 100 | 1 100 100 | 1 011 100 | 1 010 100 | 1 001 100 | 1 000 100 | 5 |
| 4 | 1 111 011 | 1 110 011 | 1 101 011 | 1 100 011 | 1 011 011 | 1 010 011 | 1 001 011 | 1 000 011 | 4 |
| 3 | 1 111 010 | 1 110 010 | 1 101 010 | 1 100 010 | 1 011 010 | 1 010 010 | 1 001 010 | 1 000 010 | 3 |
| 2 | 1 111 001 | 1 110 001 | 1 101 001 | 1 100 001 | 1 011 001 | 1 010 001 | 1 001 001 | 1 000 001 | 2 |
| 1 | 1 111 000 | 1 110 000 | 1 101 000 | 1 100 000 | 1 011 000 | 1 010 000 | 1 001 000 | 1 000 000 | 1 |
|   | A | B | C | D | E | F | G | H |   |

15 → (row 3)

Fig. 3

|   | A | B | C | D | E | F | G | H |   |
|---|---|---|---|---|---|---|---|---|---|
| 8 | 1<br>1 0 0<br>1 0 0 | 1<br>1 0 1<br>1 0 0 | 1<br>1 1 1<br>1 0 0 | 1<br>0 1 0<br>1 0 0 | 1<br>0 1 0<br>1 0 0 | 1<br>0 1 1<br>1 0 0 | 1<br>0 0 1<br>1 0 0 | 1<br>0 0 0<br>1 0 0 | 8 |
| 7 | 1<br>1 0 0<br>1 0 1 | 1<br>1 0 1<br>1 0 1 | 1<br>1 1 1<br>1 0 1 | 1<br>1 1 0<br>1 0 1 | 1<br>0 1 0<br>1 0 1 | 1<br>0 1 1<br>1 0 1 | 1<br>0 0 1<br>1 1 1 | 1<br>0 0 0<br>1 0 1 | 7 |
| 6 | 1<br>1 0 0<br>1 1 1 | 1<br>1 0 1<br>1 1 1 | 1<br>1 1 1<br>1 1 1 | 1<br>1 1 0<br>1 1 1 | 1<br>0 1 0<br>1 1 1 | 1<br>0 1 1<br>1 1 1 | 1<br>0 0 1<br>1 1 1 | 1<br>0 0 0<br>1 1 1 | 6 |
| 5 | 1<br>1 0 0<br>1 1 0 | 1<br>1 0 1<br>1 1 0 | 1<br>1 1 1<br>1 1 0 | 1<br>1 1 0<br>1 1 0 | 1<br>0 1 0<br>1 1 0 | 1<br>0 1 1<br>1 1 0 | 1<br>0 0 1<br>1 1 0 | 1<br>0 0 0<br>1 1 0 | 5 |
| 4 | 1<br>1 0 0<br>0 1 0 | 1<br>1 0 1<br>0 1 0 | 1<br>1 1 1<br>0 1 0 | 1<br>1 1 0<br>0 1 0 | 1<br>0 1 0<br>0 1 0 | 1<br>0 1 1<br>0 1 0 | 1<br>0 0 1<br>0 1 0 | 1<br>0 0 0<br>0 1 0 | 4 |
| 3 | 1<br>1 0 0<br>0 1 1 | 1<br>1 0 1<br>0 1 1 | 1<br>1 1 1<br>0 1 1 | 1<br>1 1 0<br>0 1 1 | 1<br>0 1 0<br>0 1 1 | 1<br>0 1 1<br>0 1 1 | 1<br>0 0 1<br>0 1 1 | 1<br>0 0 0<br>0 1 1 | 3 |
| 2 | 1<br>1 0 0<br>0 0 1 | 1<br>1 0 1<br>0 0 1 | 1<br>1 1 1<br>0 0 1 | 1<br>1 1 0<br>0 0 1 | 1<br>0 1 0<br>0 0 1 | 1<br>0 1 1<br>0 0 1 | 1<br>0 0 1<br>0 0 1 | 1<br>0 0 0<br>0 0 1 | 2 |
| 1 | 1<br>1 0 0<br>0 0 0 | 1<br>1 0 1<br>0 0 0 | 1<br>1 1 1<br>0 0 0 | 1<br>1 1 0<br>0 0 0 | 1<br>0 1 0<br>0 0 0 | 1<br>0 1 1<br>0 0 0 | 1<br>0 0 1<br>0 0 0 | 1<br>0 0 0<br>0 0 0 | 1 |

15 → (pointing to row 3)

Fig. 5

OPTICAL RECEIVER FOR AREA LOCATION SYSTEM

TECHNICAL FIELD OF THE INVENTION

This invention relates to position location systems using optical transmitters and receivers, and more particularly to an optical receiving unit for such systems.

BACKGROUND OF THE INVENTION

Optical location systems are used to locate a mobile object that either receives or transmits optical signals. Typical systems involve at least one object, i.e., the target, that moves within an area whose perimeter is defined by the range of the transmitter and receiver. In some systems, the target carries the transmitter and the receiver is stationary; in others, the target receives a transmitted signal. In a third type of system, the target reflects transmitted light back to a receiver. An advantage of placing the transmitting device on the target is that the transmitted signal may then contain data identifying the target.

Many optical location systems are analog in the sense that the receiver is slewed into a position close to alignment with an emitting target. At this position, the sensor operates a servo loop to lock the sensor to the target. However, such systems have narrow fields of view and do not accurately follow a rapidly moving target.

U.S. Pat. No. 2,855,539 discloses a digital optical location system in which light is passed through a code plate to a number of point sensors. The code plate contains rows and columns of "windows" of varying sizes, which represent bit positions of a digital code. A lens is used to focus a line image from a target onto one row or column at a time. Whether or not the light passes through a window of that row or column is used to determine a code, and hence the position of a target.

U.S. Pat. No. 3,602,903 discloses a digital optical location system in which a number of sensor units each have two parts. One of the two parts of each sensor unit detects light from the target. The parts are "finger shaped", so as to divide each sensor unit in a binary fashion. As resolution increases, the number of "fingers" for each sensor unit increases. The detection or non detection of light by each part of each sensor unit is used to generate a code representing the position of the target.

A third digital optical location system is described in U.S. Pat. No. 4,710,028 to Grenier. An image frame surrounding the target is focussed onto a matrix of photosensitive elements. The coordinate position of a sensitized element is used to determine the position of the target.

One limitation of existing digital optical location systems is a high correlation between the number of sensors and the resolution of the location matrix. This limitation is significant because of the cost of sensor devices. U.S. Pat. No. 4,710,028 provides a resolution of n sections where n is the number of sensing elements in the matrix. Although U.S. Pat. No. 3,602,903 uses binary coding to provide a resolution of $2^n$, where n is the number of sensor units, each sensor unit has two sensors, making the required number of sensors $2 \times 2^n$.

U.S. Pat. No. 2,855,539 provides a resolution of $2^n$, where n is the number of sensors. However, the need to focus line images on rows and columns of a code plate leads to unnecessary complexity and to accuracy problems.

A need exists for an optical location system that minimizes the number and size of sensors required for a desired resolution, and also minimizes accuracy of position finding.

SUMMARY OF THE INVENTION

One aspect of the invention is an optical location system for locating the position of a moving object in a defined area. An optical transmitter is attached to the moving object. A number of stationary optical sensors receive a signal from the transmitter. At least one of these sensors is a full-view sensor, which has a field of view of all of the area. Other sensors are partial view sensors having a field of view of the area that is at least partially blocked. The field of view of each partial view sensor is defined by an aperture associated with each sensor, such that each partial view sensor has a field of view of approximately one-half the area, but in increasingly thinner vertical nonopaque partitions or narrower horizontal nonopaque partitions. The partitions are patterned so that the detection or nondetection of light by the sensor associated with the aperture results in a signal indicating whether the object is in sections of the area seen by that sensor. A unique combination of such signals corresponds to each section of the area.

A technical advantage of the invention is that a relatively small number of small sensors, having high signal sensitivity, may be used for area location to a certain degree of resolution. Enhancements of the invention compensate for the effects of perspective viewing. A target that is farther away from the receiver can be detected with as much accuracy as a closer target.

BRIEF DESCRIPTION OF THE DRAWINGS

FIG. 3 illustrates the area of FIG. 1, mapped with the binary coding of the receiver unit of FIG. 2.

FIG. 5 illustrates the area of FIG. 1, mapped with gray coding of the receiver of FIG. 4.

DETAILED DESCRIPTION OF THE INVENTION

Figure 1:
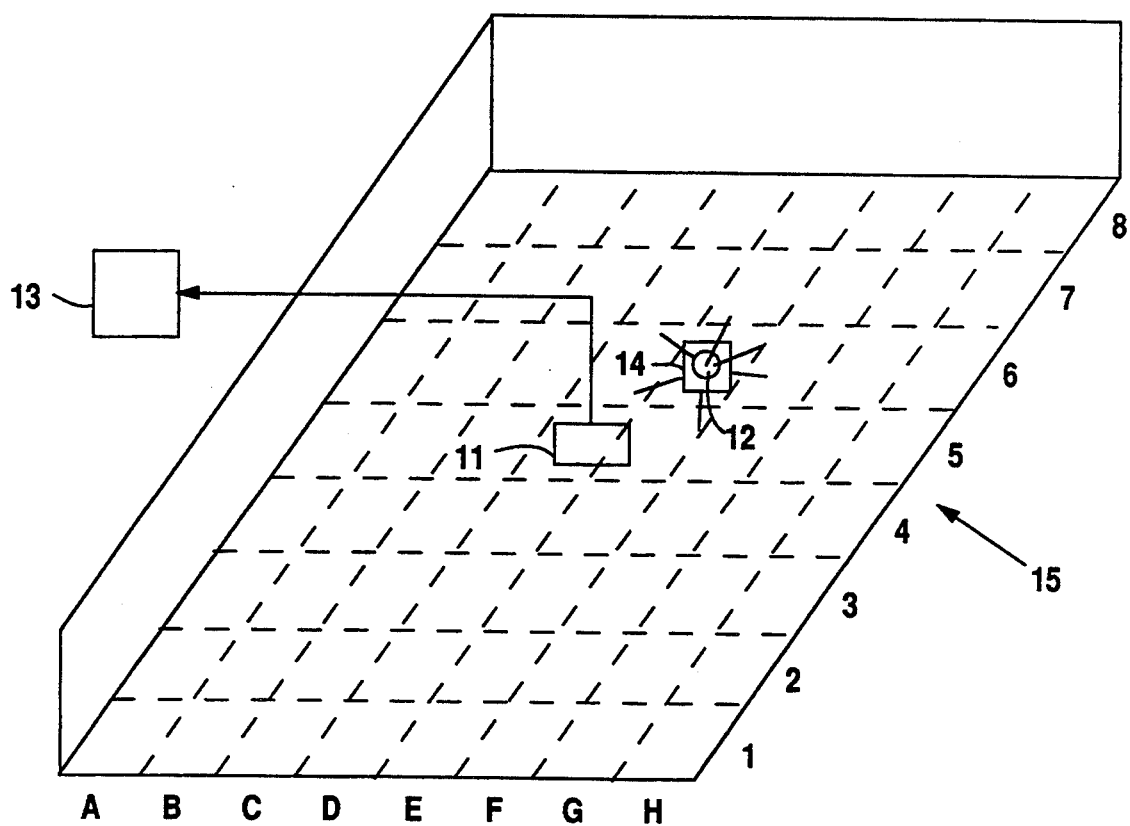
FIG. 1 illustrates the optical location system, a target, and an area in which the target is to be located.

FIG. 1 illustrates an optical location system, comprised essentially of a receiver 11 and transmitter 12 and a processing station 13, which are used to locate a target 14 moving within a defined area 15. For example, target 14 might be a work piece, such as a printed circuit board, which travels from one production station to another in a manufacturing plant during assembly.

The system of FIG. 1 is a two-dimensional location system, in the sense that position is determined in terms of x and y coordinates of a plane parallel to the floor of the location area 15. In the example of this description, area 15 may be conceptualized as a grid of 64 sections, which in FIG. 1 are each identified by a letter A–H and an integer 1–8. Target 14 is shown in section (E,6).

The various components of a location system and its operation, are described in detail in U.S. Pat. No. 5,119,104 to Heller, which is incorporated herein by reference. Although that description is in terms of radio transmissions, the same data coding and processing may be used for optical data transmissions. That patent describes both a time-of-arrival system and an area detection system. In the case of the latter system, different receivers are configured to detect transmissions from assigned areas within a location area. Location of the target is determined by which receiver detects transmissions. As explained below, a similar concept is used for the optical location system of the present invention, in that each of a number of sensors is associated with some part of a location area. However, in the present invention, more than one sensor may simultaneously detect a transmission signal and the receipt of signal by certain combinations of sensors is used to determine the location of the target.

Transmitter 12 is attached to target 14, and transmits an omni-directional or near omni-directional optical signal at selected intervals. The signal typically includes an identifier so that if there is more than one target 14, it may be distinguished from other targets 14. In the preferred embodiment, transmitter 12 is an infrared source, which emits pulses representing digital information. However, transmitter 12 may also emit visible light or other radiation. Various devices for providing such an optical signal are known in the art of electro-optical devices.

As explained below in connection with FIGS. 2–8, receiver 11 is a set of point photosensors, each having a predetermined field of view of area 15. In a typical embodiment, the sensors are small, i.e., 0.1 inch, optical diode sensors. The field of view of each sensor is defined by an associated aperture. The detection or nondetection of light by each sensor is coded and used to locate target 14.

In some embodiments of the invention, receiver 11 is best placed at a midpoint over area 15, as shown in FIG. 1. However, as explained below in connection with FIGS. 6–8, alternative embodiments permit receiver 11 to be placed over an end of area 15, with modifications made for perspective. Regardless of where receiver 11 is placed, at least one sensor has a field of view that includes the entire area 15 and each other sensor has a field of view defined by its aperture.

Processing station 13 receives the output from receiver 11, which in its simplest form is a signal indicating that a certain sensor has detected incoming light from transmitter 12. In more complicated systems, a sequence of signals may be decoded to identify the particular transmitter 12 being sensed. Processing station 13 accumulates data pertaining to each target 14 and its movement. The data that may be supplied to processing station 13 and its operation are described in U.S. Pat. No. 5,119,104.

The concepts described herein could also be used for an optical location system in which transmitter 12 is stationary and receiver 11 is attached to target 14. For multiple targets 14, transmissions could be coded so that a target 14 receives only transmissions identified with that target.

Figure 2:
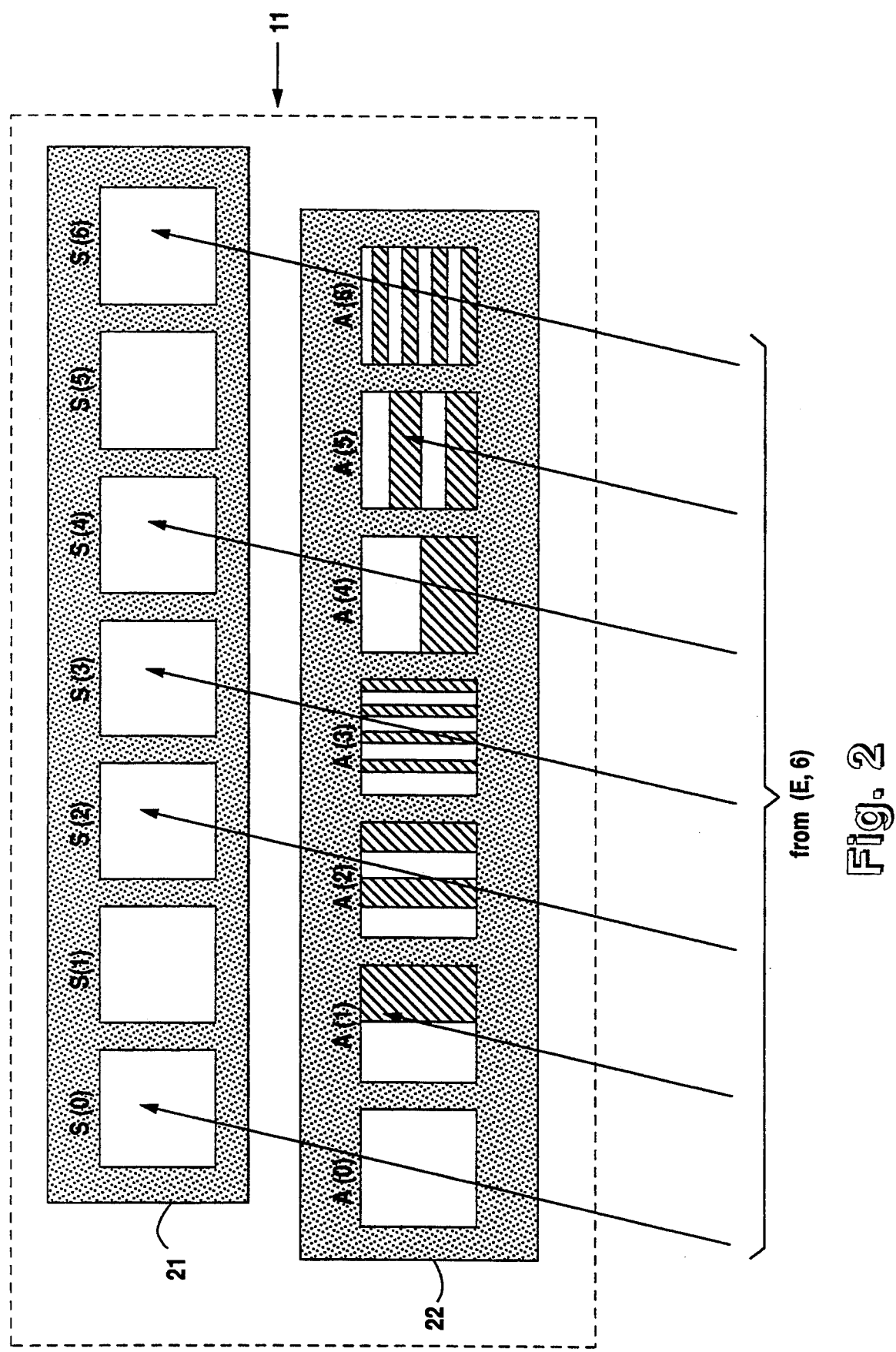
FIG. 2 illustrates a binary receiver unit having a set of sensors and an aperture template, where each sensor has an associated aperture for determining that sensor's field of view of the area of FIG. 1.

FIG. 2 illustrates receiver 11, which is comprised primarily of a sensor unit 21 and an aperture template 22. In the preferred embodiment, where sensor unit 21 contains a linear array of sensors, a single template having a window in front of each sensor is used to define the field of view of each sensor. However, other means for providing a field of view window for each sensor could be used, such as a separate window in front of each sensor, such as a liquid crystal shutter device.

Sensor unit 21 has a number of sensor points, $S(0)$–$S(6)$, which may be "on-site" photosensors or may be the receiving end of an optic fiber leading to a photosensor. For purposes of this description, either embodiment entails the use of a photosensitive means for detecting light and responding with an electrical signal. Conventional photosensitive devices, such as photodiodes may be used. Typically, transmitter 12 is an infrared transmitter, thus sensors $S(0)$–$S(6)$ detect infrared signals.

In the embodiment of this description, sensor unit 21 has seven sensor points, $S(0)$–$S(6)$. This number of sensor points is related to the number of sections of area 15, in that n number of sensor points will locate a target 14 to a precision of $2^{n-1}$ sections. Thus, for seven sensor points, $2^{7-1}$ is 64, which corresponds to 64 sections of area 15. As the following description will indicate, typically, n is an odd integer value, $n=3, 5, 7, \ldots$ This permits the use of one detector that sees the entire area 15, and pairs of detectors that see certain portions of area 15 in equal resolution. As a result, area 15 is a square array of sections, such as the $8 \times 8$ array of FIG. 1.

In the 7-sensor embodiment of FIG. 2, one sensor, i.e., sensor $S(0)$, has a full field view of area 15. Each other sensor $S(1)$–$S(6)$ has a full field of view of area 15, but for certain blocked portions. Although the total field of view of each sensor is one-half of area 15, the partitioning of visible versus nonvisible areas varies from sensor to sensor. As will be explained below, the partitioning of the fields of views of the sensors is similar to the mapping of bit positions on a Karnaugh map where more than one bit may be high in a given section. In other words, more than one sensor may see the same section of area 15. The simultaneous and overlapping fields of view permit the sensors to generate a code that indicates which section target 14 is in. If there is more than one target 14 in area 15, an identifier and a location code can be detected for each target.

Aperture template 22 is used to define the fields of view of each sensor. Template 22 is essentially a set of apertures $A(0)$–$A(6)$, with a one-to-one relationship between each aperture $A(i)$ and each sensor $S(i)$, where $i=0 \ldots 6$ in the example of this description. A first aperture $A(0)$ permits its associated sensor $S(0)$ to view all sections of area 15. Each of the other 6 apertures $A(1)$–$A(6)$ has nonopaque strips so that a certain portion of the view of its associated sensor $S(1)$–$S(6)$ is blocked and that sensor sees only certain sections of area 15.

Template 22 may be formed by a number of means. In a typical embodiment, template 22 is an opaque piece of plastic, having transparent or cut-out strips.

Although not shown in FIG. 2, various means for ensuring that each sensor receives only light from its associated aperture may be used. For example, dividers could be placed between adjacent sensors. Or, a light pipe can be used to connect each aperture to its sensor.

Three apertures, A(1)–A(3), divide area 15 into vertical strips, and are referred to herein as the "vertical apertures". Three apertures, A(4)–A(6), divide area 15 into horizontal strips, and are referred to herein as the "horizontal apertures".

As a result of the different opaque/nonopaque portions of the apertures, each set of vertical and each horizontal apertures divides area 15 into progressively smaller strips. Thus, vertical apertures A(1)–A(3) divide area 15 into 2, 4, and 8 vertical strips, respectively into 2, 4, and 6 horizontal strips, respectively. For either the horizontal or vertical apertures, for each ith additional aperture, area 15 is divided into $2^i$ vertical or horizontal strips of equal width. Each i+1th aperture has strips that are ½ the width of those of the ith aperture.

For each set of vertical or horizontal apertures, the opaque/nonopaque partitioning is binary in the sense that each ith aperture permits its associated detector to see or not see, alternatively, a $\frac{1}{2^{ith}}$ strip of area 15. Thus, for example, aperture A(3) permits sensor S(3) to alternately see or not see ⅛ of the vertical length of area 15. Similarly, aperture A(6) permits sensor S(6) to alternately see or not see ⅛ of the horizontal width of area 15.

The rays 23 shown in FIG. 2 illustrate incoming light from a target 14 in section (E,6) of area 15. This light is assumed to be collimated, which is a fair assumption given the relative size of a typical area 15 with respect to the sensors of sensor unit 21. As shown, sensors S(0), S(2), S(3), S(4), and S(6) receive light from target 14. However, light that would otherwise fall upon sensors S(1) and S(5) is blocked by the associated blocking portions of apertures A(1) and A(5) of template 22.

The detection or nondetection of light by each sensor S(0)–S(6) can be coded to determine which section target 14 is in. Each sensor corresponds to a bit position of a seven-bit code. A bit value is 0 or 1 depending on whether or not target 14 is seen by the sensor corresponding to that bit position. Using the example of FIG. 2, if target 14 is in section S(E,6), the corresponding code is 1011101, where sensor S(0)–S(6) correspond to the most significant to the least significant bits.

FIG. 3 illustrates the binary code corresponding to each section of an area 15 having 64 sections. The first bit position is always "1" to indicate light from any section as detected by sensor S(0), when target 14 is in area 15 and emitting a signal. This eliminates ambiguity when target 14 is in section (H,1), where the code would otherwise be 000000 and it would be uncertain whether target 14 was in area 15 at all. For each set of vertical or horizontal apertures, as target 14 moves from one end of area 15 to another, a most significant bit changes its value 2 times, a second most significant bit changes $2^2$ times, etc.

A characteristic of template 22 of FIG. 2 is that horizontal or vertical apertures may share borders of sections of area 15. As a target 14 moves from one section to an adjacent section across a shared border, the state of more than one sensor is changed. For example, if target 14 moves from section (E,6) to section (E,7), the code changes from 1011101 to 1011110, and two bit positions should simultaneously change values. For a target 14 sitting on or near a shared border, the resulting code may be ambiguous if the apertures of template 22 are not well aligned. For example, a target 14 that is actually sitting on the border of sections (D,2) and (E,2) may be detected as being in section (D,2) by sensor S(1) but in section (D,1) by sensor S(2).

Figure 4:
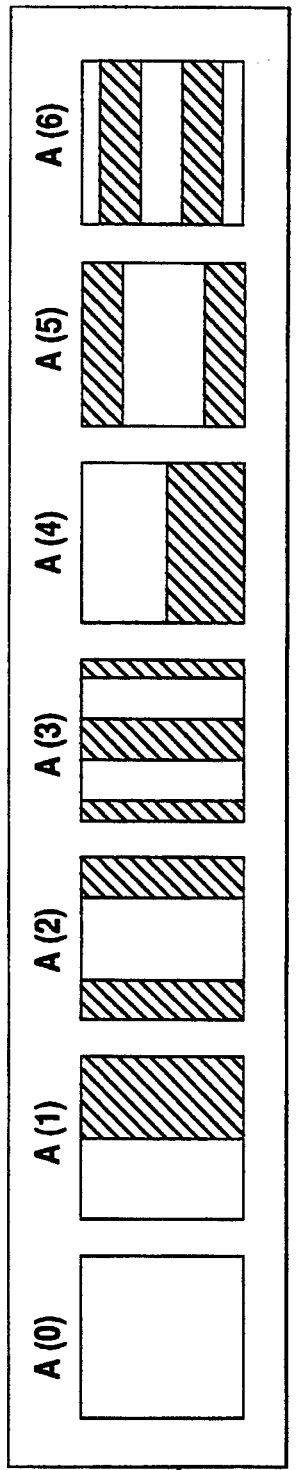
FIG. 4 illustrates an alternative aperture template for a gray code receiver.

FIG. 4 illustrates an alternative version of aperture template 42, which eliminates shared borders. It is a "gray-code" template in the sense that as target 14 moves from section to section, only one bit position of the corresponding code changes. The same sensor unit 21 as in FIG. 2 is used, although it is not shown in FIG. 4. As in FIG. 2, each sensor S(0)–S(6) is associated with an aperture A(0)–A(6).

Like template 22, template 42 has one aperture A(0), which permits its associated sensor S(0) to view the entire area 15. Also, like template 22, template 42 has a set of vertical apertures A (1)–A (3) and a set of horizontal apertures A (4)–A (6). Each aperture A(1)–A(6) permits its sensor to view a total ½ of the area 15. A first vertical aperture A(1) and a first horizontal aperture A(4) have nonopaque portions that permit their corresponding sensors S(1) and S(4) to view the right or left, top or bottom half of area 15, respectively.

However, unlike the apertures of template 22, the apertures of template 42 have overlapping windows. Thus, for example, aperture A(1) has a window over the left half of its sensor S(1). Its consecutive aperture, A(2), has a block over the leftmost half of the left half of sensor S(2), a window over the right half of the left half and over the left half of the right half, a block over the right half of the rightmost half. As a result, the middle edge of the window of aperture A(1) is not blocked by aperture A(2). Similarly, aperture A(3) has window over a block over the right half of the leftmost quarter of sensor S(3), a window over the right half of the next quarter, a window over the left half of the third quarter, and a window over the right half of the rightmost quarter, such that it does not block the dividing borders of the windows of aperture A(2). Additional vertical apertures would follow this same pattern. Likewise, the horizontal apertures have blocks and windows over alternating halves of halves.

FIG. 5 illustrates the gray code resulting from the use of template 42. As in FIG. 3, area 15 has 64 sections. However, as target 14 moves from any section to an adjacent section, only one bit changes its value.

A characteristic of templates 22 and 42 is that they are best suited for a receiver unit 11 placed over the center of area 15. It is from this placement that the effect of perspective is minimized, and the sections of area 15 appear most like the equal squares that they are. However, as area 15 becomes large, the shape of those sections farther away from receiver 11 becomes distorted by perspective. This may lead to inaccurate location codes. Also, if receiver 11 were placed over the perimeter of area 15, the effects of perspective would be significant for sections farther away.

Figure 6:
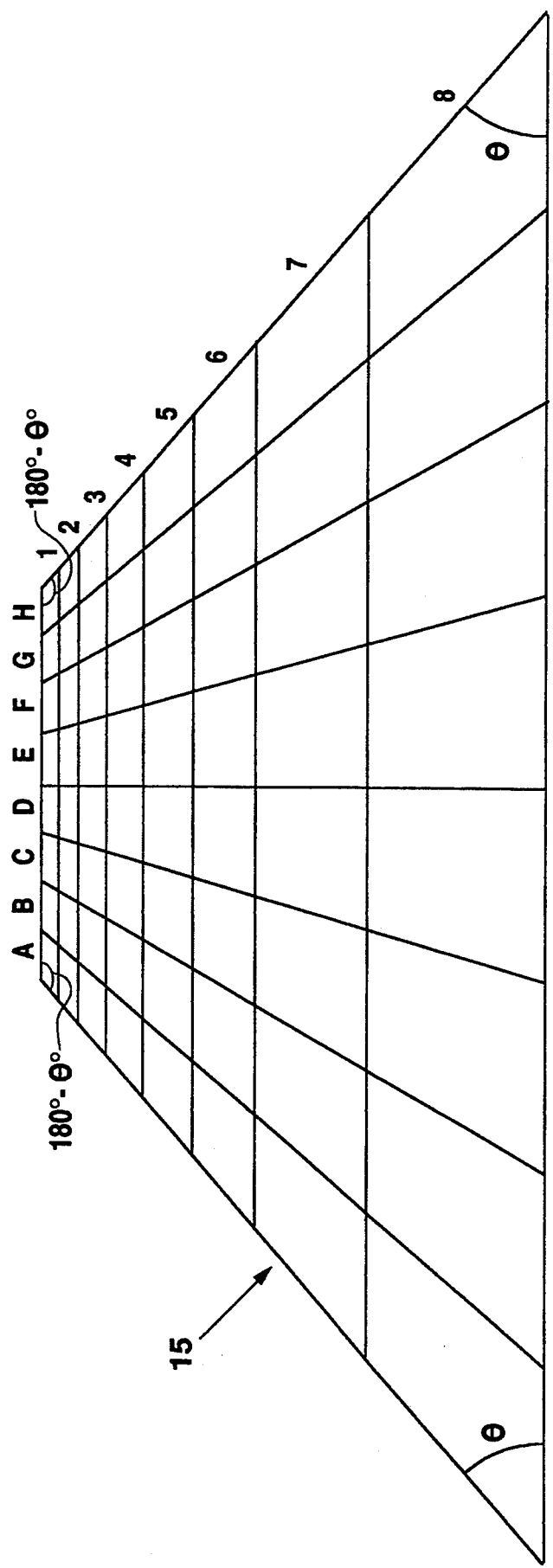
FIG. 6 illustrates the area of FIG. 1, from a perspective viewpoint of a sensor.

FIG. 6 is a perspective view of area 15 from a receiver 11 placed over the shared border of sections (D,8) and (E,8). As is true of any perspective view, objects that are closer appear larger. Closer sections such as A(8)–H(8) appear larger than farther away sections such as A(1)–H(1). Also, each section appears to have a trapezoidal rather than a square shape. In FIG. 3, the angles of distortion for the outermost sections are designated as Θ degrees and 180−Θ degrees.

Figure 7:
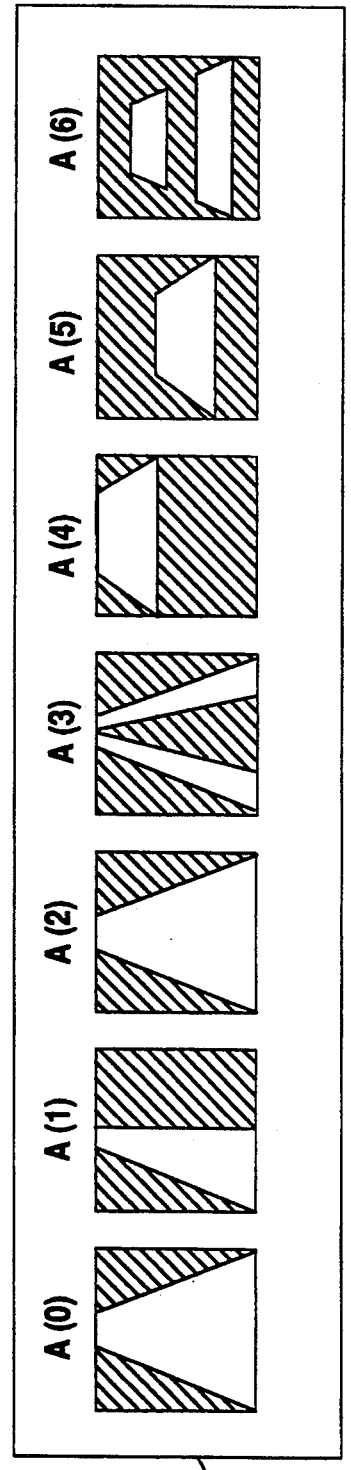
FIG. 7 illustrates an alternative aperture template for a receiver that compensates for perspective.

FIG. 7 illustrates a third embodiment of aperture template 72, which is designed to compensate the perspective view of the sensors of sensor unit 21. Template 72 is a gray code template, similar to that of template 42. However, consistent with the distorted shapes of the sections of area 15, the windows of apertures A(1)–A(6) are wider for closer portions of the field of view of area 15. The top of each aperture corresponds to the back of area 15, i.e., sections A(1)-H(1). Unlike templates 22 and 42, template 72 is not symmetrical from top to bottom.

As an example, sensor S(2), which has a field of view of the two mid-quarters of area 15, has an aperture window that is thinner at the top, which sees farther away sections, than at the bottom. The sides of the window are angled in a manner that corresponds to the apparent angle caused by perspective, i.e., angles $\Theta$ and $180-\Theta$. As a result, sensor S(2) sees square sections.

As another example of shaping apertures A(1)-A(2) to compensate for perspective, sensor S(4) is a horizontal sensor that sees the farther away top half of area 15 and hence the nonopaque window of A(4) is shifted toward the top of A(4). Similarly, the nonopaque windows of the other horizontal apertures, A(5) and A(6) are shifted to the top of their apertures and are for farther away sections. The window of A(4) is wider than the window of A(5) even though it sees the same number of sections because its sections are closer. Also, the bottom window of A(6) is wider than that of the top window of A(6).

Thus, in a manner that corresponds to the perspective view of FIG. 3, the windows of the apertures A(0)-A(6) are angled at their sides and thinner at their top than at the bottom. Horizontal windows corresponding to farther away sections are shifted to the top of their apertures, and are relatively narrower than windows for closer sections.

Figure 7A:
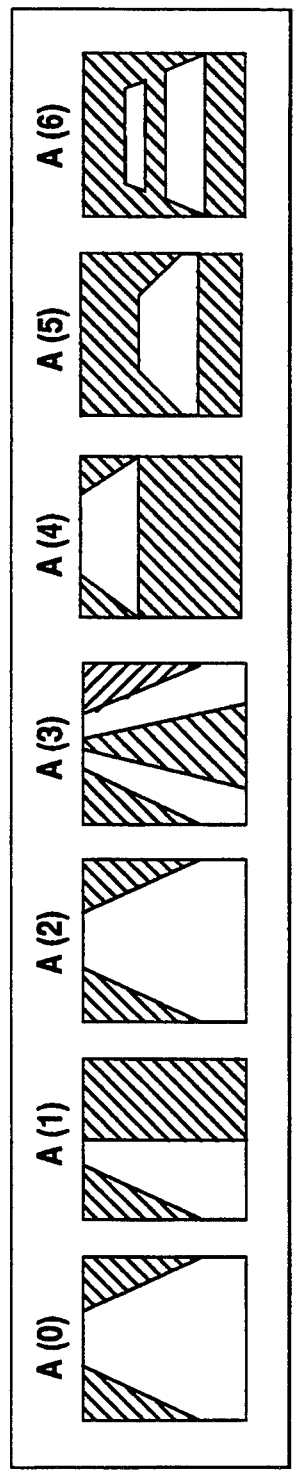
FIG. 7A illustrates a modification of the template of FIG. 7 for use with smaller sensors.

FIG. 7A illustrates a feature of the invention that permits some tolerance for adjusting the relative size of the sensor and its aperture. By truncating the any or all edges of the apertures, smaller sensors could be used for the same area 15. There would be some corresponding loss of accuracy in locating an object at the edges of area 15, but for some applications, this might not be a problem.

Figure 8:
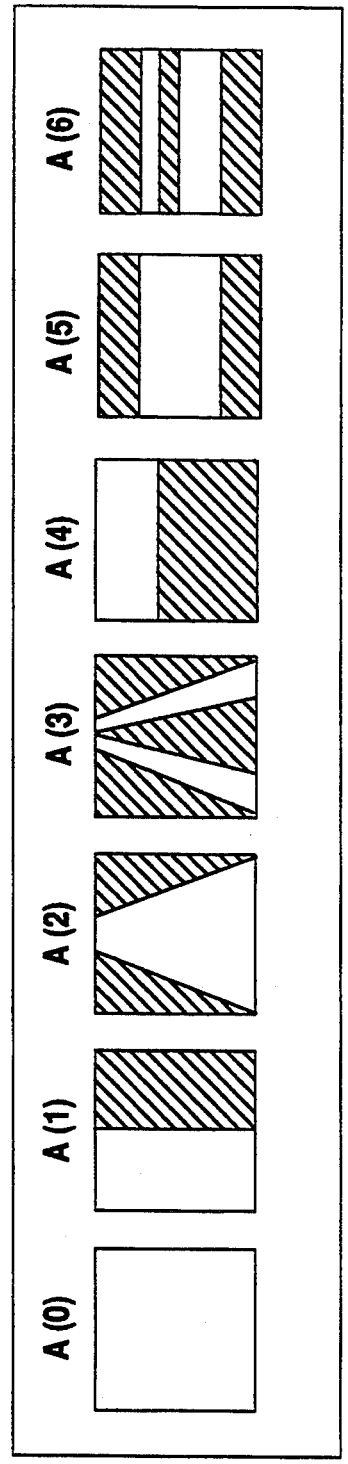
FIG. 8 illustrates an alternative aperture template for a receiver that compensates for perspective without undue limitation of accuracy.

FIG. 8 is another embodiment of a template 82. As in FIG. 7, the aperture fields of view corresponding to farther away sections are narrower than for closer sections. Also, the fields of view for farther away sections is shifted toward the top of the horizontal apertures. However, additional modifications have been made to enhance accuracy when a target 14 is located at an outside perimeter of area 15. As shown, although internal angles, i.e., those of vertical apertures A(2) and A(3) remain, external angles are straightened. In FIG. 8, these external angles are those of apertures A(0), A(1), A(4), A(5), and A(6).

As a result of the aperture shapes of FIG. 8, when target 14 is not in a perimeter section of area 15, the sensors that detect target 14 see a square section. However, in the left and right perimeter sections of area 15, the fields of view are expanded.

It should be understood that the use of a square area 15, with square sections in a square matrix is for purposes of simplicity. Area 15 or its sections could be rectangular, in which case the number of sensors or the proportions of the apertures would be adjusted. For example, area 15 could have 8×4 square sections, using only sensors S(0)-S(5) with the corresponding apertures. Or, area 15 could have 8×8 rectangular sections using rectangular apertures whose vertical and horizontal divisions are in increasing smaller halves in accordance with the vertical and horizontal dimensions of the apertures.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical location system for locating the position of a moving object in a defined area, comprising:
   an optical transmitter for attachment to the moving object;
   a number of optical sensors for receiving a signal from said transmitter,
   wherein one of said sensors is a full-view sensor having a field of view of all of said defined area; and
   an opaque template for each of said sensors other than said full view sensor,
   wherein each of said templates has at least one horizontal or vertical blocking strip for partially blocking the field of view of said sensors other than said full-view sensor, such that each of said sensors other than said full-view sensor is a horizontal or vertical partial view sensor having a field of view of approximately one-half of said defined area, as determined by at least one horizontal or vertical window where said at least one blocking strip does not cover the field of view,
   and wherein said blocking strips or said windows vary in size and number with respect to each of said horizontal or vertical partial view sensors, such that the detection or non detection of a signal from said transmitter can be used to form a digital code that represents a resolution of said defined area of $2^n$ where n is the number of said partial view sensors and having not more than n+1 sensors.

2. The system of claim 1, wherein each said template has alternating blocking strips and windows of equal size, such that for each ith additional partial view sensor, the blocking strips and windows of its template are one-half as wide but twice as many in number as those of the ith-1 sensor, such that said digital code is a binary code.

3. The system of claim 1, wherein each said template has alternating blocking strips and windows, such that for each ith additional sensor, its template has a window or blocking strip that provides that sensor with a field of that overlaps the field of view of the ith-1 sensor, such that said digital code is a gray code.

4. The system of claim 1, wherein said templates comprise a set of templates having vertical blocking strips and a set of templates having horizontal blocking strips.

5. The system of claim 1, wherein said windows are shaped such that each window has a varying width, with wider portions corresponding to the view of closer portions of said area, to compensate for a perspective view of said sensors.

6. The system of claim 5, wherein said windows are truncated.

7. The system of claim 5, wherein said windows are shaped to compensate for a perspective view except where said window defines a perimeter of the field of view of said area.

8. A method of locating a moving target in a defined area, comprising the steps of:
- attaching an optical transmitter to a target whose movement is within a defined area;
- receiving optical signals from said transmitter using a number of sensors;
- using one of said sensors to view all of said defined area;
- partially blocking the field of view of one or more of said sensors by placing an opaque strip or strips over said one or more of said sensors, such that each is a partial view sensor having a field of view of approximately one-half said defined area, as determined by at least one nonopaque horizontal or vertical window over each of said partial view sensors where said at least one blocking strips does not cover the field of view, and such that said blocking strips or said windows vary in size and number with respect to each of said horizontal or vertical partial view sensors, and such that the detection or non detection of a signal from said transmitter can be used to form a digital code that represents a resolution of said defined area of $2^n$ where n is the number of said partial view sensors and having not more than n+1 sensors.

9. The method of claim 8, wherein said step of partially blocking is performed such that each said template has alternating blocking strips and windows of equal size, such that for each ith additional partial view sensor, the blocking strips and windows of its template are one-half as wide but twice as many in number as those of the ith-1 sensor, such that said digital code is binary code.

10. The method of claim 8, wherein said step of partially blocking is performed such that each said template has alternating blocking strips and windows, such that for each ith additional sensor, its template has a window or blocking strip that provides that sensor with a field of field that overlaps the field of view of the ith-1 sensor, such that said digital code is gray code.

11. The method of claim 8, wherein said step of partially blocking is performed by shaping each of said windows with a varying width, with wider portions corresponding to closer portions of said area, to compensate for a perspective view of said area.

12. The method of claim 1, and further comprising the step of locating a number of said targets and identifying said targets by means of an optical identification code.

13. An optical receiver for receiving an optical signal from a moving transmitter in a defined area, and generating digital code indicating the location of said transmitter within said area, comprising:
- a number of optical sensors for receiving a signal from said transmitter,
- wherein one of said sensors is a full-view sensor having a field of view of all of said defined area; and
- a template for each of said sensors other than said full view sensor,
- wherein each of said templates has at least one horizontal or vertical blocking strip for partially blocking the field of view of said sensors other than said full-view sensor, such that each of said sensors other than said full-view sensor is a horizontal or vertical partial view sensor having a field of view of approximately one-half of said defined area, as determined by at least one horizontal or vertical window where said at least one blocking strip does not cover the field of view,
- and wherein said blocking strips or said windows vary in size and number with respect to each of said horizontal or vertical partial view sensors, such that the detection or non detection of a signal from said transmitter can be used to form a digital code that represents a resolution of said defined area of $2^n$ where n is the number of said partial view sensors and having not more than n+1 sensors.

14. The receiver of claim 13, wherein each said template has alternating blocking strips and windows of equal size, such that for each ith additional partial view sensor, the blocking strips and windows of its template are one-half as wide but twice as many in number as those of the ith-1 sensor, such that said digital code is a gray code.

15. The receiver of claim 13, wherein each said template has alternating blocking strips and windows, such that for each ith additional sensor, its template has a window or blocking strip that provides that sensor with a field of field that overlaps the field of view of the ith-1 sensor, such that said digital code is a gray code.

16. The receiver of claim 13, wherein said templates comprise a set of templates having vertical blocking strips and a set of templates having horizontal blocking strips.

17. The receiver of claim 13, wherein said windows are shaped such that each window has a varying width, with wider portions corresponding to the view of closer portions of said area, to compensate for a perspective view of said sensors.

18. The receiver of claim 17, wherein said windows are truncated.

19. The receiver of claim 17, wherein said windows are shaped to compensate for a perspective view except where said windows define a perimeter of the field of view of said area.

* * * * *